(12) United States Patent
Longuemare et al.

(10) Patent No.: US 7,475,760 B2
(45) Date of Patent: Jan. 13, 2009

(54) PAD CONTACT DETECTION METHOD

(75) Inventors: Pierre Claude Longuemare, Paris (FR); Paul Marie Degoul, Paris (FR); Jon T. Zumberge, Centerville, OH (US); Bryan P. Riddiford, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 248 days.

(21) Appl. No.: 11/243,214

(22) Filed: Oct. 4, 2005

(65) Prior Publication Data

US 2007/0074937 A1 Apr. 5, 2007

(51) Int. Cl.
*F16D 65/36* (2006.01)

(52) U.S. Cl. .............. 188/156; 188/1.11 R; 188/1.11 L; 188/1.11 E; 188/158; 188/71.7

(58) Field of Classification Search ............. 188/1.11 E, 188/1.11 L, 1.11 W, 156, 71.7, 158, 162, 188/157, 1.11 R, 159; 303/20
See application file for complete search history.

(56) References Cited

U.S. PATENT DOCUMENTS

| | | | |
|---|---|---|---|
| 4,995,483 A | | 2/1991 | Moseley et al. |
| 5,001,640 A | * | 3/1991 | Matsumoto et al. ............ 701/77 |
| 5,957,246 A | * | 9/1999 | Suzuki ....................... 188/72.1 |
| 6,003,640 A | * | 12/1999 | Ralea ......................... 188/71.5 |
| 6,186,599 B1 | * | 2/2001 | Otomo et al. .................. 303/20 |
| 6,217,131 B1 | * | 4/2001 | Schanzenbach ............. 303/112 |
| 6,279,694 B1 | * | 8/2001 | Bohm et al. ................. 188/162 |
| 6,422,659 B2 | * | 7/2002 | Disser ........................... 303/20 |

(Continued)

FOREIGN PATENT DOCUMENTS

FR 2 855 610 12/2004

(Continued)

OTHER PUBLICATIONS

English language Abstract for FR 2 855 610 extracted from espacenet.com database dated Aug. 22, 2005.

(Continued)

*Primary Examiner*—Robert A Siconolfi
*Assistant Examiner*—Thomas W Irvin
(74) *Attorney, Agent, or Firm*—Thomas N. Twomey

(57) ABSTRACT

The invention provides an electric brake system and method. The electric brake system includes an electric motor having a portion moveable along a path between a plurality of positions for moving a brake pad and applying a selectable amount of braking force on a brake rotor. One of the plurality of positions is a minimal contact position. The minimal contact position is operable to change among the plurality of positions over time. The electric brake system also includes an electric controller for controlling the electric motor to move the portion along the path between the minimal contact position and at least one other of the plurality of positions for moving the brake pad and for selecting the amount of braking force. The electric brake system also includes at least one sensor for sensing at least one of motor current, motor acceleration, controller voltage, motor speed, motor voltage, and motor temperature, and communicating a sensed condition to the controller. The controller is operable to change the minimal contact position in response to the condition sensed and communicated by the at least one sensor.

9 Claims, 2 Drawing Sheets

U.S. PATENT DOCUMENTS

| | | | |
|---|---|---|---|
| 6,464,308 B2 * | 10/2002 | Kubota | 303/20 |
| 6,471,015 B1 * | 10/2002 | Ralea et al. | 188/1.11 L |
| 6,536,562 B1 | 3/2003 | Böhm et al. | |
| 6,662,906 B1 * | 12/2003 | Bohm et al. | 188/1.11 E |
| 6,868,323 B2 * | 3/2005 | Kichima et al. | 701/70 |
| 6,922,636 B2 * | 7/2005 | Balasubramanian et al. | 702/2 |
| 7,185,745 B2 * | 3/2007 | Godlewsky et al. | 188/158 |
| 2001/0030462 A1 * | 10/2001 | Disser | 303/20 |
| 2004/0065516 A1 * | 4/2004 | Kramer | 188/71.7 |
| 2004/0212249 A1 * | 10/2004 | Yamaguchi et al. | 303/122.04 |
| 2005/0082122 A1 * | 4/2005 | Taylor et al. | 188/1.11 L |
| 2005/0104446 A1 * | 5/2005 | Chico et al. | 303/155 |
| 2005/0194836 A1 * | 9/2005 | Simpson et al. | 303/20 |
| 2005/0216160 A1 * | 9/2005 | Zumberge et al. | 701/70 |
| 2005/0269872 A1 * | 12/2005 | Ralea | 303/20 |
| 2006/0090968 A1 * | 5/2006 | Taylor et al. | 188/1.11 L |
| 2006/0219486 A1 * | 10/2006 | Wagner et al. | 188/1.11 L |
| 2007/0052289 A1 * | 3/2007 | Nilsson et al. | 303/20 |
| 2007/0068237 A1 * | 3/2007 | Zumberge | 73/121 |
| 2008/0029355 A1 * | 2/2008 | Kawahara et al. | 188/72.1 |

FOREIGN PATENT DOCUMENTS

FR      2 855 611      12/2004

OTHER PUBLICATIONS

English language Abstract for FR 2 855 611 extracted from espacenet.com database dated Aug. 22, 2005.

\* cited by examiner

PAD CONTACT DETECTION METHOD

FIELD OF THE INVENTION

The invention relates to a braking system for a vehicle and more particularly for a method for detecting when a brake pad is in contact with a brake rotor.

BACKGROUND OF THE INVENTION

Braking force is generated by electric brakes with an electric motor. Usually, movement generated by the electric motor is communicated to the brake pad through a planetary gear pack and a ball screw. A force sensor can be disposed to provide feedback to a controller of the motor so the controller can correlate between the extent of movement of the electric motor and the amount of braking force generated at the caliper.

SUMMARY OF THE INVENTION

The invention provides an electric brake system and method. The electric brake system includes an electric motor having a portion moveable along a path between a plurality of positions for moving a brake pad and applying a selectable amount of braking force on a brake rotor. One of the plurality of positions is a minimal contact position. The minimal contact position is operable to change among the plurality of positions over time. The electric brake system also includes an electric controller for controlling the electric motor to move the portion along the path between the minimal contact position and at least one other of the plurality of positions for moving the brake pad and for selecting the amount of braking force. The electric brake system also includes at least one sensor for sensing at least one of motor current, motor acceleration, controller voltage, motor speed, motor voltage, and motor temperature, and communicating a sensed condition to the controller. The controller is operable to change the minimal contact position in response to the condition sensed and communicated by the at least one sensor.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

The invention provides a method and electric brake system for detecting contact between a brake pad and a brake rotor. The method can associate a minimal level of braking force being applied to the brake rotor by the brake pad with a particular position of motor for an electric caliper. As the brake pad wears, the position of the motor associated with the minimal level of braking force will change. However, the method is operable to detect when the brake pad is contacting the brake force with minimal braking force regardless of the extent of brake pad wear.

Figure 1:
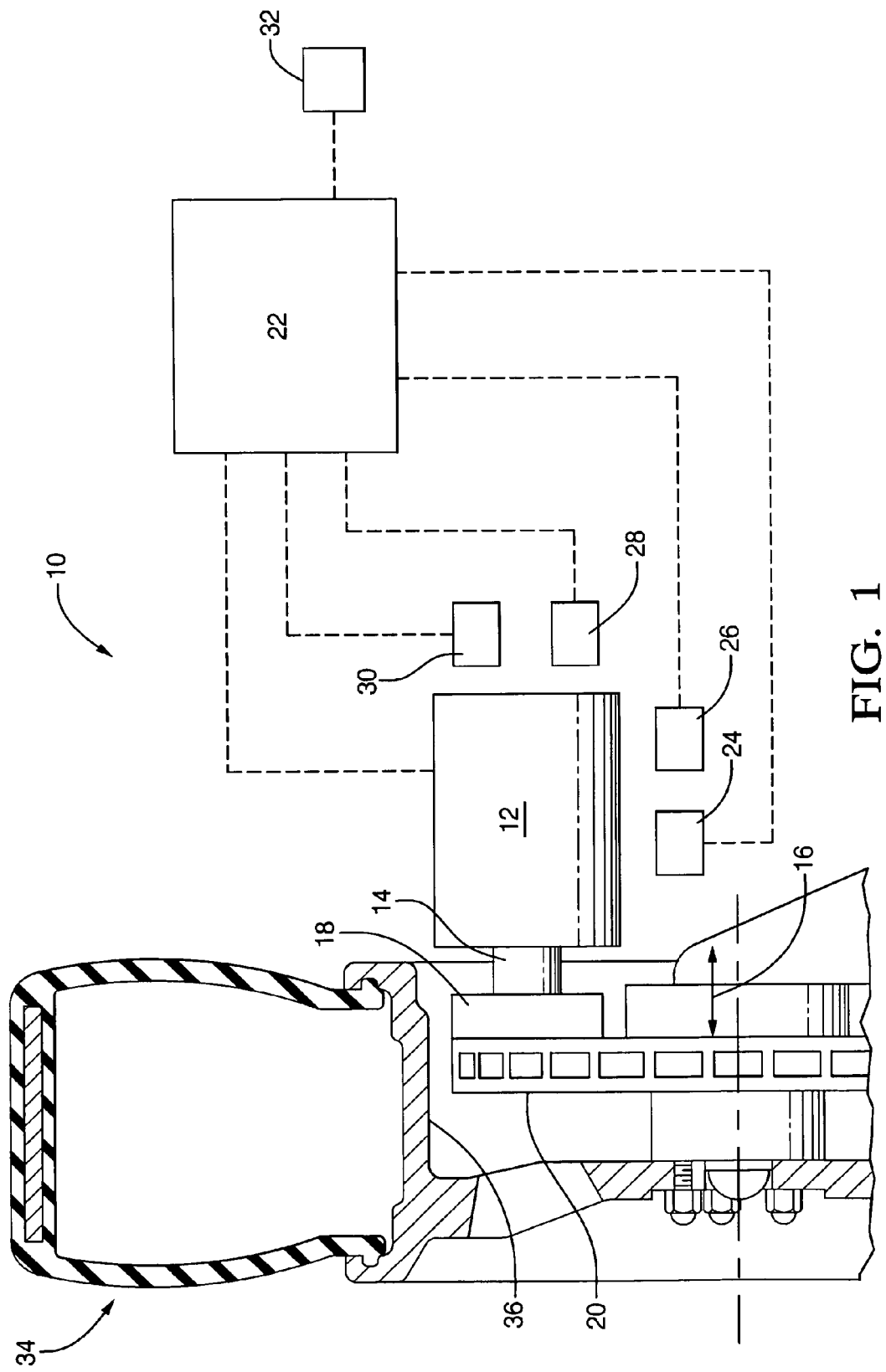
FIG. 1 is a schematic diagram of an electric brake system according to the exemplary embodiment of the invention.

Referring now to FIG. 1, an electric brake system 10 includes an electric motor 12 having a portion 14 moveable along a path 16 between a plurality of positions for moving a brake pad 18 and applying a selectable amount of braking force on a brake rotor 20. FIG. 1 schematically shows one brake pad 18, however, he portion 14 could communicate movement to two pads disposed on opposite sides of the brake rotor 20 in alternative embodiments of the invention. The brake rotor 20 is engaged to rotate with a wheel assembly 34 having a wheel 36.

The electric motor 12 moves the brake pad 18 relative to the brake rotor 20. For example, the electric motor 12 moves the portion 14 closer to the brake rotor 20 to apply greater pressing force on the brake pad 18 and increasing braking force on the rotor 20. The portion 14 can be a shaft or a pin or any other structure capable of communicating movement between the motor 12 and the brake pad 18.

One of the plurality of positions among which the portion 14 moves is a minimal contact position. The minimal contact position of the portion 14 corresponds to the brake pad 18 contacting the brake rotor 20 with a minimal amount of force being applied to the brake pad 18 by the portion 14. This position of the portion 14 of the motor 12 can also be referred to as the "minimal force" position. The identification of the minimal force position of the portion 14 can be useful, for example, when determining the braking force applied by the electric brake when the portion 14 moves from the minimal force position to a braking position where greater braking force is applied. The minimal contact position is operable to change among the plurality of positions over time. As the brake pad 18 wears, the minimal contact position will change. Also, thermal contraction and expansion of the brake pad 18 will cause the minimal contact position to change.

The electric brake system 10 also includes an electric controller 22 for controlling the electric motor 12 to move the portion 14 along the path 16 between the minimal contact position and at least one other of the plurality of positions for moving the brake pad 18 and for selecting the amount of braking force. The electric brake system 10 also includes at least one sensor such as sensors 24, 26, 28, 30, 32 for sensing at least one of motor current, motor acceleration, controller voltage, motor speed, motor voltage, and motor temperature, and communicating a sensed condition to the controller 22. A single sensor may detect more than one condition or may detect a single condition. For example, motor speed can be detected and motor acceleration can be derived from the sensed motor speed.

The controller 22 is operable to change the minimal contact position along the path 16, in other words reassign the location of the minimal contact position along the path 16, in response to the condition sensed and communicated by the at least one sensor. The exemplary method applies the Mahalanobis Taguchi System ("MTS") to the electric brake system 10 to change the minimal contact position of the portion 14 along the path 16. The MTS allows for the analysis of data corresponding to several different conditions related to the electric brake system 10 to determine if the brake pad 18 is in contact with the brake rotor 20 with a minimal amount of force being applied to the brake pad 18 by the portion 14. In the exemplary method, the following categories of data will be considered: (1) motor current, (2) motor acceleration, (3) bus voltage, (4) motor speed, (5) voltage across the motor, (6) wheel speed, and (7) wheel acceleration. Motor acceleration can be estimated or measured. Bus voltage is the voltage across a controller of the motor. Motor speed can be estimated or measured. The number of categories of data is referred to as k. Less than all the seven exemplary categories of data can be considered in alternative embodiments of the invention or more than the seven exemplary categories of data can be considered. Also, alternative categories of data could be considered in addition to, or in place of, any of the categories listed above, such as motor temperature.

Figure 2:
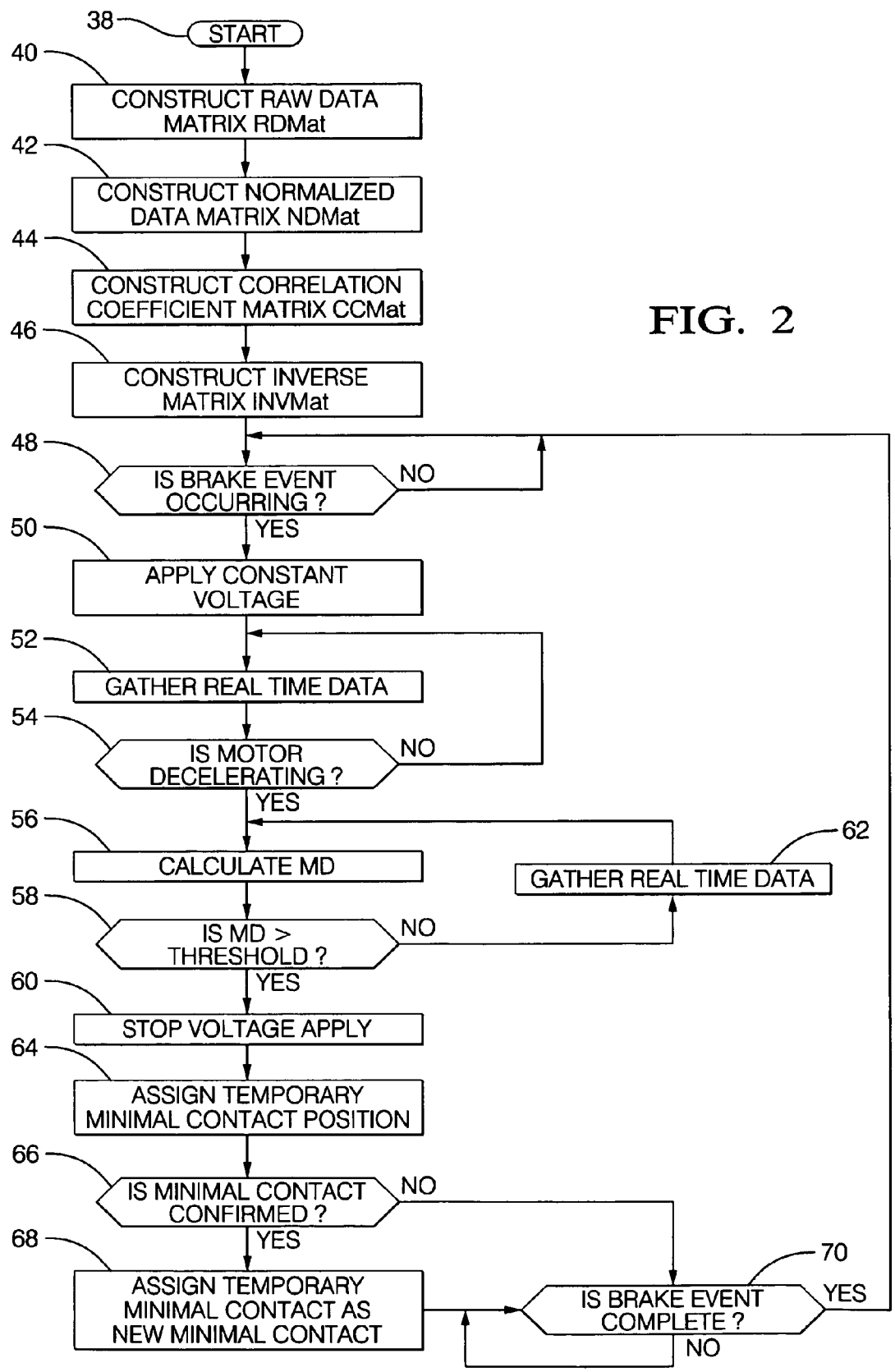
FIG. 2 is a simplified flow diagram of the steps for carrying out a method according to the exemplary embodiment of the invention.

FIG. 2 shows a simplified flow diagram for applying MTS. The process starts at step 38. At step 40, a desired number of observations n of the categories of data k are made to form a matrix. Each observation n is defined by a value for each of the seven categories of data. For example, the first observation $n_1$ would be defined by a motor current ($mc_1$) value, a motor acceleration ($ma_1$) value, a bus voltage ($bv_1$) value, a motor speed ($ms_1$) value, a voltage across the motor ($vm_1$) value, a wheel speed ($ws_1$) value, and a wheel acceleration ($wa_1$) value. If, for example, one hundred observations are made (n=1, 2, 3, . . . 100), the resulting matrix RDMat of raw data will have one hundred rows and seven columns. Each item of data in the raw data matrix RDMat can be denoted as $Y_{i,j}$ where the subscript i corresponds to the row or observation, ranging from 1 to n. The subscript j corresponds to the category of data or column, ranging from 1 to k. In other words, one column of the raw data matrix RDMat will correspond to motor current (mc) values, another to motor acceleration (ma) values, another to bus voltage (bv) values, and others to motor speed (ms) values, voltage across the motor (vm) values, wheel speed (ws) values, and wheel acceleration (wa) values.

In the exemplary method, the raw data matrix RDMat corresponds to "normal conditions." Normal conditions correspond to applying a constant voltage to the motor 12 before the portion 14 reaches the minimal contact position. This position is another of the plurality of positions and, for clarity, can be referred to as the secondary position. The portion 14 moves from the secondary position to the minimal contact position to move the brake pad 18 to contact the brake rotor 20. The brake pad 18 contacts the brake rotor 20 with a minimal amount of force at the minimal contact position. A minimal amount of force corresponds to the brake pad contacting the brake rotor without substantially inhibiting rotation of the brake rotor. The creation of the raw data matrix RDMat can be completed under controlled circumstances. For example, the raw data matrix RDMat is created with data that can be corroborated as corresponding to normal conditions. A brake system can be evaluated under controlled conditions, such as in a lab or on a test track, using a plurality of sensors that can sense the brake pad contacting the brake rotor with minimal force. While the plurality of sensors verify normal conditions, data corresponding to the seven categories listed above is taken to form the raw data matrix RDMat.

At step 42, the data of the raw data matrix RDMat is normalized since each of the seven categories of data has a different scale. A normalized data matrix NDMat is constructed from the raw data matrix RDMat. The normalized data matrix NDMat includes items of data denoted as $y_{i,j}$ where the subscript i corresponds to the row, ranging from 1 to n. The subscript j corresponds to the column, ranging from 1 to k. Each item $y_{i,j}$ of the normalized data matrix NDMat correlates to the corresponding item $Y_{i,j}$ in the raw data matrix RDMat as follows:

$$y_{i,j} = (Y_{i,j} - Y_{j\,ave.})/\sigma_j$$

where $Y_{j\,ave.}$ is the average value of all the items in the j column of the raw data matrix RDMat and where $\sigma_j$ is the standard deviation of the j column of the raw data matrix RDMat. Each column, or each data category, will define a value for $Y_{j\,ave.}$ including an average value ($Y_{mc\,ave}$) for motor current (mc), an average value ($Y_{ma\,ave}$) for motor acceleration (ma), an average value ($Y_{bv\,ave}$) for bus voltage (bv), an average value ($Y_{ms\,ave}$) for motor speed (ms), an average value ($Y_{vm\,ave}$) for voltage across the motor (vm), an average value ($Y_{ws\,ave}$) for wheel speed (ws), and an average value ($Y_{wa\,ave}$) for wheel acceleration (wa). Similarly, each column, or each data category, will define a value for $\sigma_j$ including a standard deviation ($\sigma_{mc}$) for motor current (mc), a standard deviation ($\sigma_{ma}$) for motor acceleration (ma), a standard deviation ($\sigma_{bv}$) for bus voltage (bv), a standard deviation ($\sigma_{ms}$) for motor speed (ms), a standard deviation ($\sigma_{vm}$) for voltage across the motor (vm), a standard deviation ($\sigma_{ws}$) for wheel speed (ws), and a standard deviation ($\sigma_{wa}$) for wheel acceleration (wa).

At step 44, a correlation coefficient matrix CCMat is constructed from the normalized data matrix NDMat. The correlation coefficient matrix CCMat includes items of data denoted as $r_{i,j}$ where the subscript i corresponds to the row the subscript j corresponds to the column. The correlation coefficient matrix CCMat will be a square matrix. Each item $r_{i,j}$ of the correlation coefficient matrix CCMat correlates to the corresponding item $y_{i,j}$ in the normalized data matrix NDMat as follows:

$$\text{Both } r_{i,j} \text{ and } r_{j,i} = (\Sigma(y_{l,i} \times y_{l,j}))/n \ (l=1, 2, 3, \ldots n)$$

At step 46, the inverse matrix INVMat of the correlation coefficient matrix CCMat is constructed. The inverse matrix INVMat includes items of data denoted as $a_{i,j}$ where the subscript i corresponds to the row and the subscript j corresponds to the column.

Steps 40-46 can be considered as calibration steps for the exemplary electric brake. The controller 22 of the electric brake can be programmed with the raw data and/or the results of the mathematical equations applied to the raw data, such as one or more of the raw data matrix RDMat, the normalized data matrix NDMat, the correlation coefficient matrix CCMat, and the inverse matrix INVMat.

During normal vehicle handling, the process continues to step 48 and the controller 22 determines if a brake event is occurring. A brake event occurs when the driver engages the brakes of the vehicle, such as through depressing the brake pedal, or a vehicle controller exercises control and engages the brakes of the vehicle, such as during traction control event.

If a brake event is occurring, the process continues to step 50 and the controller 22 controls the motor 12 to move the portion 14 an incremental distance along the path 16. The controller 22 moves the portion 14 by applying a constant voltage across the motor 12.

The process continues to step 52 and supplemental data is gathered in real-time, during normal vehicle handling. For example, a plurality of new observations $n_{supp}$ can be taken where each new observation $n_{supp}$ can be defined by values for each of the categories k of data. For example, a first new observation $n_{supp1}$ taken during operation would be defined by a motor current ($mc_{supp1}$) value, a motor acceleration ($ma_{supp1}$) value, a bus voltage ($bv_{supp1}$) value, a motor speed ($ms_{supp1}$) value, a voltage across the motor ($vm_{supp1}$) value, a wheel speed ($ws_{supp1}$) value, and a wheel acceleration ($wa_{supp1}$) value. The one or more sensors 24-32 mentioned above can sense conditions corresponding to the categories of data and communicate signal(s) to the controller 22. The supplemental data can be gathered in increments of 2 milliseconds, for example. The data is gathered from the sensors 24-32 and communicated to the controller 22.

After step 52, the process confirms whether or not the motor 12 is decelerating at step 54. It is desirable to confirm that the motor 12 has stopped accelerating because of the acceleration that occurs in the motor 12 upon the initial application of voltage to bring the motor 12 up to speed. Once the motor 12 is at a desired speed based on the constant voltage subsequent steps in the exemplary process can be performed.

The process continues to step 56 and a Mahalanobis Distance MD is calculated to evaluate whether the brake pad 18 is contacting the brake rotor 20 with a minimal amount of force—i.e., whether the portion 14 is at the minimal contact position along the path 16. The Mahalanobis Distance MD is calculated in part using to the data programmed with respect to the controller 22 such as one or more of the raw data matrix RDMat, the normalized data matrix NDMat, the correlation coefficient matrix CCMat, and the inverse matrix INVMat. The Mahalanobis Distance MD is also calculated in part using data supplemental with respect to the raw data mentioned above; the data gathered during step 52.

The calculation of the Mahalanobis Distance MD starts by normalizing the supplemental or real-time data. For each of the newly gathered values of the categories k of data, a normalized value NV is determined by the controller 22. For example, the following normalized values will be determined in the exemplary method: motor current NVmc, motor acceleration NVma, bus voltage NVbv, motor speed NVms, voltage across the motor NVvm, wheel speed NVws, and wheel acceleration NVwa. The normalized value NV for the motor current mc, for example, relates to the new motor current data $mc_{supp}$ as follows:

$$NVmc=(mc_{supp}-Y_{mc\ ave.})/\sigma_{mc}$$

where $mc_{supp}$ is the new observation or value of motor current, and where $Y_{mc\ ave.}$ is the average value of all the items in the motor current (mc) column of the raw data matrix RDMat and where $\sigma_{mc}$ is the standard deviation of the mc column of the raw data matrix RDMat. As set forth above, raw data matrix RDMat includes a number of columns corresponding to the number of categories of data. Thus, the normalized value NV is derived in part from the data gathered during the calibration steps and in part from data gathered in real time or during normal vehicle handling. Both sources of data relate to the same category.

After normalized values NV for each category are determined, the following equation is applied to determine the Mahalanobis Distance MD:

$$(MD)^2=(\Sigma(a_{i,j}\times NV_i\times NV_j))/k$$

where both i and j go from 1 to k and where k is the number of categories. The first equation for the summation operation would be, for example:

$$a_{1,1}\times NV_1\times NV_1$$

where $a_{1,1}$ is the value of the item at row 1, column 1 of the inverse matrix INVMat of the correlation coefficient matrix CCMat, and where $NV_1$ is the normalized value of the first category of data, such as motor current (mc), for example. A subsequent equation for the summation operation would be, for example:

$$a_{2,1}\times NV_2\times NV_1$$

where $a_{2,i}$ is the value of the item at row 2, column 1 of the inverse matrix INVMat of the correlation coefficient matrix CCMat, where $NV_2$ is the normalized value of the second category of data, and where $NV_1$ is the normalized value of the first category of data.

The Mahalanobis Distance MD that is calculated based in part on the supplemental or real time data is compared with a predetermined value, or threshold value, at step 58 to determine whether the brake pad 18 is contacting the brake rotor 20 with a minimal amount of force. This predetermined value corresponds to an acceptable Mahalanobis Distance MD. The acceptable Mahalanobis Distance MD can be selected in view of the raw data gathered during calibration.

Generally, if one or more observations (each observation being a set of values including one value for each category k) or rows in the raw data matrix RDMat were applied to the equation for the Mahalanobis Distance MD, the resulting values obtained for the Mahalanobis Distance MD will be less than 1. Furthermore, this observation corresponds to the portion 14 not in contact with the brake rotor 20. If each observation included in the raw data matrix RDMat were applied to the equation for the Mahalanobis Distance MD, the resulting values obtained for the Mahalanobis Distances MD would create a Mahalanobis Space MS. A predetermined value greater than 1 can be determined and programmed with respect to the controller 22 to compare with Mahalanobis Distances MD calculated from the supplemental data. For example, a Mahalanobis Distance MD, or predetermined value, corresponding to the brake pad is contacting the rotor with a minimal amount of force could range from 1 to 5.

During normal vehicle operating conditions when supplemental data is considered, if the brake pad 18 is contacting the brake rotor 20 with a minimal amount of force, the values obtained for the Mahalanobis Distance MD based on the supplemental data will be greater than 1. Also, the new observation based on the supplemental data will correspond to a point inside the Mahalanobis Space MS if the brake pad 18 is not contacting the brake rotor 20 with a minimal amount of force. On the other hand, if the value obtained for the Mahalanobis Distance MD is much larger than 1, the likelihood that the brake pad 18 is contacting the brake rotor 20 with minimal force increases. In other words, a new observation will correspond to a point inside the Mahalanobis Space MS if the brake pad 18 is not contacting the brake rotor 20 with a minimal amount of force.

At step 58, the controller 22 determines if the calculated Mahalanobis Distance MD is greater than the acceptable Mahalanobis Distance MD (the predetermined value). If so, the brake pad 18 is in contact with the brake rotor 20 with minimal force and the controller 22 correlates the then-current position of the portion 14 as the minimal contact position along the path 16. The process continues to step 60 and the voltage applied at step 50 is ceased. If not, additional data is gathered at step 62 and the process returns to step 56. During this loop defined by step 56 to step 62 to step 56, the motor 12 is moving the brake pad 18 closer to the brake rotor 20.

After step 60, the process continues to step 64 and the controller 22 temporarily assigns the then-current position of the portion 14 along the path 16 as the minimal contact position. At step 66, the accuracy of the steps 56-64 can be confirmed by applying the method disclosed in co-pending U.S. application Ser. No. 11/013,867, filed Dec. 16, 2004, which is hereby incorporated by reference. If the accuracy of the steps 56-64 is confirmed, the process moves to step 68 and the controller 22 confirms the assignment of the then-current position of the portion 14 along the path 16 as the minimal contact position and the process continues to step 70.

If the accuracy of the steps 56-64 is not confirmed at step 66, the process moves to step 70 and the controller 22 confirms the brake event detected at step 48 is completed. Another step between 66 and 70 could be performed to determine the basis for any discrepancy between the results of steps 56-64 in view of the results of step 66. When the brake event is complete, the process returns to step 48.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electric brake system comprising:
   an electric motor having a portion moveable along a path between a plurality of positions for moving a brake pad and applying a selectable amount of braking force on a brake rotor, wherein one of said plurality of positions being a minimal contact position associated with minimal friction between the brake pad and the brake rotor, said minimal contact position operable to change among said plurality of positions over time;
   an electric controller for controlling said electric motor to move said portion along said path between said minimal contact position and at least one other of said plurality of positions for selecting the amount of braking force; and
   at least one sensor for sensing at least two of motor current, motor acceleration, controller voltage, motor speed, motor voltage, and motor temperature of said electric motor, and communicating the sensed conditions to said controller, wherein said controller being operable to change said minimal contact position along said path in response to the sensed conditions communicated by said at least one sensor,
   wherein said electric controller is also defined as being programmed with an inverse matrix derived from raw data associated with at least two of motor current, motor acceleration, controller voltage, motor speed, motor voltage, and motor temperature correlated with respect to a secondary position adjacent said minimal contact position and
   wherein said electric controller is further defined as being programmed to calculate a Mahalanobis Distance to evaluate whether the portion is at the minimal contact position along the path based in part on the inverse matrix derived from the raw data and in part from the sensed conditions communicated by said at least one sensor.

2. The electric brake system of claim 1 wherein said electric controller is further defined as being operable to change the minimal contact position in response to the calculated Mahalanobis Distance.

3. A method for controlling an electric brake system comprising:
   moving a portion of an electric motor along a path between a plurality of positions for moving a brake pad to apply a selectable amount of braking force on a brake rotor, wherein one of the plurality of positions is a minimal contact position associated with minimal friction between the brake pad and the brake rotor, the minimal contact position operable to change among the plurality of positions over time;
   controlling the electric motor with an electric controller to move the portion along the path between the minimal contact position and at least one other of the plurality of positions for selecting the amount of braking force; and
   sensing at least two of motor current, motor acceleration, controller voltage, motor speed, motor voltage, and motor temperature of said electric motor with at least one sensor operable to communicate the sensed conditions to the controller, wherein the controller is operable to change the minimal contact position along the path in response to the sensed conditions communicated by said at least one sensor,
   wherein said controlling step also comprises the step of:
      changing the minimal contact position along the path in response to the sensed condition communicated by the at least one sensor with the controller and
   wherein said controlling step further comprises the steps of:
      first constructing a raw data matrix with raw data associated with at least two of the motor current, motor acceleration, controller voltage, motor speed, motor voltage, and motor temperature wherein the raw data corresponds to a secondary position adjacent said minimal contact position;
      second constructing a normalized data matrix from the raw data matrix;
      third constructing a correlation coefficient matrix from the normalized data matrix;
      fourth constructing an inverse matrix of the correlation coefficient matrix; and
      fifth calculating a Mahalanobis Distance to evaluate whether the portion is at the minimal contact position along the path based in part on the inverse matrix derived from the raw data and in part from the sensed conditions communicated by said at least one sensor.

4. The method of claim 3 wherein said controlling step further comprises the step of:
   positioning the portion at said secondary position prior to said first constructing step.

5. The method of claim 3 wherein said controlling step further comprises the step of:
   programming the controller with the inverse matrix.

6. The method of claim 3 further comprising the step of:
   selecting the minimal contact position with the controller as being the position along the path of the portion of the electric motor when the brake pad and the brake rotor contact one another with minimal force being applied to the brake rotor by the brake pad.

7. The method of claim 6 further comprising the step of:
   changing the minimal contact position with the controller in response to wear of the brake pad.

8. The method of claim 7 wherein said changing step further comprises the step of:
   correlating changes in at least one of motor current, motor acceleration, controller voltage, motor speed, motor voltage, and motor temperature with one of wear of the brake pad, thermal expansion of the brake pad, and thermal contraction of the brake pad.

9. An electric braking system comprising:
   a brake rotor;
   a brake pad movably positioned relative to said brake rotor;
   an electric motor having a portion moveable along a path between a plurality of positions for moving said brake pad and applying a selectable amount of braking force on said brake rotor, wherein one of said plurality of positions being a minimal contact position associated with minimal friction between said brake pad and said brake rotor, said minimal contact position operable to change among said plurality of positions over time;
   an electric controller for controlling said electric motor to move said portion along said path between said minimal contact position and at least one other of said plurality of positions for selecting the amount of braking force; and at least one sensor for sensing at least motor current, motor acceleration, controller voltage, motor speed, motor voltage, and motor temperature of said electric motor, and communicating the sensed conditions to said controller, wherein said controller being operable to change said minimal contact position along said path in response to the sensed condition communicated by said at least one sensor, wherein said electric controller is also defined as being programmed with an inverse matrix derived from raw data associated with at least motor current, motor acceleration, controller voltage, motor speed, motor voltage, and motor temperature correlated with respect to a secondary position adjacent said minimal contact position and wherein said electric controller is further defined as being programmed to calculate a Mahalanobis Distance to evaluate whether the portion is at the minimal contact position along the path based in part on the inverse matrix derived from the raw data and in part from the sensed conditions communicated by said at least one sensor.

* * * * *